United States Patent [19]

Bonnebat et al.

[11] Patent Number: 4,959,252

[45] Date of Patent: Sep. 25, 1990

[54] HIGHLY ORIENTED THERMOTROPIC OPTICAL DISC MEMBER

[75] Inventors: Claude Bonnebat, Pontault-Combault; Jean-Pierre Quentin, Lyon; Alain Morin, Villeurbanne, all of France

[73] Assignee: Rhone-Poulenc Chimie, Courbevoie, France

[21] Appl. No.: 418,966

[22] Filed: Oct. 10, 1989

Related U.S. Application Data

[63] Continuation-in-part of Ser. No. 102,475, Sep. 29, 1990, abandoned.

[30] Foreign Application Priority Data

Sep. 29, 1986 [FR] France .................................. 86 13715

[51] Int. Cl.$^5$ .............................................. G11B 23/00
[52] U.S. Cl. .......................................... 428/64; 428/65; 428/156; 428/480; 430/271
[58] Field of Search ................... 428/64, 65, 480, 156; 430/271

[56] References Cited

U.S. PATENT DOCUMENTS

| | | | |
|---|---|---|---|
| 4,126,726 | 11/1978 | Soeding | 428/64 |
| 4,626,493 | 12/1986 | Butters et al. | 430/271 |
| 4,668,549 | 5/1987 | Lippits et al. | 430/271 |
| 4,680,211 | 7/1987 | Evans et al. | 428/65 |
| 4,719,171 | 1/1988 | Ikenaga et al. | 430/271 |

Primary Examiner—Paul J. Thibodeau
Attorney, Agent, or Firm—Sherman and Shalloway

[57] ABSTRACT

Rigid, dimensionally stable, essentially circular and planar, axially injection-molded disc members, well adapted as support substrates for radiation sensitive layers for optical discs, e.g., laser discs, comprise radially molecularly oriented thermotropic polymers and such disc members have a radiation-sensitive microrelief pattern on at least one of the face surfaces thereof.

14 Claims, 2 Drawing Sheets

HIGHLY ORIENTED THERMOTROPIC OPTICAL DISC MEMBER

CROSS-REFERENCE TO RELATED APPLICATION

This application is a continuation-in-part of application Ser. No. 07/102,475 filed Sept. 29, 1987, now abandoned.

BACKGROUND OF THE INVENTION

1. Field of the Invention

The present invention relates to injection-molded, rigid and etched polymeric substrates for optical recording or reading discs, based on thermotropic polymers This invention also relates to the optical discs fabricated from such substrates By the term "optical disc" as utilized herein, there are intended all types of recording media for readout by a laser beam, which may be recorded:

(a) either during their manufacture, by a molding or pressing stage which forms a microrelief on the surface of the disc substrate (compact disc or video disc type);

(b) or by means of an irreversible thermal inscription, also produced under a laser beam and generally characterized by a modification of the sensitive recording layer in the form of holes or bubbles or other local microdamage;

(c) or in a reversible thermal or thermomagnetic manner, without the formation of an irreversible physical modification of the sensitive layer, by producing a change of state or in the direction of magnetization of the layer which, by virtue of its reversibility, presents the option of a deletion or a rewriting.

2. Description of the Prior Art

In order to produce an optical disc, materials of three types are generally combined, in a manner known per se (see FIGS. 1 and 2 of the attached drawings, each of which shows, on no particular scale, a view of an optical disc in fragmentary section through a plane containing the axis of the disc):

(i) a substrate 1 which is in most cases a transparent material and consequently serves as an input layer for the luminous beam. The thickness of this input layer generally ranges from 1 mm to 2 mm. To enable the recording track to be defined and to be traced by the laser beam, part or all of the face surface distant from the input face surface of this substrate 1 is provided with grooves (or reliefs) 2 of concentric shape, or arranged in a spiral, inside which or between which are stored the data required for the synchronization, data identification or tracking control. It is highly advantageous to produce the microreliefs 2 directly at the time when the substrate 1 is molded, but this is possible only in the case of materials capable of being injection-molded. In the case of a material such as glass, this microrelief must be produced by a stage of photopolymerization of a varnish deposited in the form of a very thin layer. This operation must be carried out under very clean conditions to avoid defects due to contamination by dust. It can also be the source of defects which can extend to the rejection of the disc because of the formation of microbubbles or of a tearing away of the microrelief over the course of the molding and demolding utilizing a die member. For these reasons, it is preferable to have the option of employing a polymeric material as the substrate 1 and to produce the microrelief 2 directly at the point in time of the injection molding;

(ii) a reflective sensitive layer 3 secured to the said pre-etched substrate (in the case where the disc already contains all the data, this layer obviously serves only as the reflective layer); and (iii) a rear protective or backing layer 4, transparent or opaque, which may be defined simply by a protective varnish. In the case of a disc having a double input face surface, this rear layer may be a structure which is identical to that of the input layer 1.

The assembly of the input layer 1 and of the rear layer 4 is via connecting means 5 which may, for example, consist of resilient coaxial seals 6 which ensure perfect leakproofing if desired (the disc then has a structure known as the air seal sandwich type 7 or of a transparent bonding material 8 (the disc then has a structure known as the laminated type).

In the case of a disc having a single input face, such as that described in FIGS. 1 and 2, it is quite advantageous to employ the same type of transparent material to manufacture both the input layer 1 and the protective layer 4.

In one known alternative embodiment (see FIG. 3 of the drawings), the sensitive reflective layer 3 may also be disposed on the face surface of the rear layer 4 which confronts the input layer 1; in this embodiment, the rear layer 4 then serves as a substrate, while the input layer 1 serves only as an optical separation. A structure of such type permits a nontransparent material to be employed as substrate 4 if need be. U.S. Pat. No. 4,074,282 describes a disc having a structure of this type, in which the thickness of the substrate 4 has been reinforced and that of the input layer 1 has been reduced in order to make it possible to use materials of low rigidity to produce the substrate.

In contradistinction to the case of the structures of FIGS. 1 and 2, in the case of the structure of the type as that shown in FIG. 3, the substrate 4 whereon the microetching 2 and the sensitive layer 3 are deposited no longer serves as an input receiving layer, but, to the contrary, serves as a rear layer. In this case, the material of the input layer 1 must be perfectly planar and transparent.

However, the structures of the type as shown in FIG. 3 are of no particular interest when the material employed as the substrate 4 presents no outstanding rigidity or stability properties while remaining capable of being injection-molded.

Indeed, in the case of a glass substrate, the structures which are generally preferred are those of the types of FIG. 1 or 2, a defective substrate being reemployed, where applicable, for the rear layer 4. However, glass substrates are particularly costly to manufacture and mandate an additional photopolymerization operation which, moreover, affects the efficiency of manufacture. Attempts have therefore been made to replace the glass with injection-molded plastic substrates.

To date, attempts have been made to utilize transparent materials for the manufacture of plastic substrates, such as to produce structures of the types shown in FIG. 1 or 2, in which the substrate also serves as an input layer.

The fact that a polymeric substrate is required to have excellent optical properties (high transparency, absence of birefringence, homogeneity) limits the selection of polymeric materials as a practical matter, to materials of amorphous structure, because it is known that semicrystalline polymers, which incidentally have the advantage of superior mechanical and thermal properties, are opaque or highly light scattering materials. It is known to this art, for example, that polymethylmethacrylate and even polycarbonate are materials which are potentially too limited, with regard to rigidity and optical properties, to be employed in optical discs which comprise moisture- or oxidation-sensitive recording layers.

The injection-moldable polymeric material adapted for use as a substrate must combine very diverse properties such as:

(1) Excellent moldability (fluid material) to permit the filling of mold microcavities and shrinkage-free demolding;

(2) The feasibility of producing undistorted planar articles (absence of internal stresses liable to produce buckling)

(3) A high rigidity which is required for the stability of the assembled disc, especially to prevent the distortion of the sensitive layer under the influence of external pressure changes; and (4) High dimensional stability (thermal behavior, insensitivity to moisture, low coefficient of expansion).

Also to date, transparent plastic substrates have been successfully employed only for discs of small size and when the recording layer is not highly oxidation- or moisture-sensitive. However, recent work has demonstrated the need to investigate materials of other types, particularly modified polyolefins and modified polycarbonate, but this is an extremely limited direction of improvement, insofar as certain required properties (for example, high rigidity and transparency) cannot be concomitantly imparted.

The addition of fillers is a known technique for correcting the natural values of polymeric materials with regard to rigidity (when it is too low; for example, when a modulus o elasticity is too low) and dimensional stability (when it also is too low; for example, when a coefficient of heat expansion is too high). However, the use of fillers must be avoided in molding rigid substrates made of a plastic material for optical discs, since their presence can play a role which is detrimental to surface quality and to dimensional stability. Furthermore, the melt viscosity of filled polymer is too high to permit precision molding with good reproducibility of the die corresponding to the microrelief, as discussed above.

SUMMARY OF THE INVENTION

Accordingly, a major object of the present invention is the provision of an improved polymeric material for the production of substrates for optical discs, such polymeric material having particular intrinsic characteristics which are advantageously and unexpectedly combined under the influence of the conditions for the conversion thereof in order to impart the following principal properties:

(i) very high rigidity, resulting from a self-reinforcement of the substrate during the injection molding (ii) very high dimensional stability, reflected in a very low value of the coefficient of heat expansion in the radial direction;

(iii) absence of shrinkage on demolding; and (iv) an extremely low water uptake.

Briefly, the present invention features a circular, rigid substrate fabricated from polymeric material etched on a part or all of at least one of the face surfaces thereof, for an optical recording or reading disc, and wherein on the one hand, such polymeric material is a thermotropic polymer, and further wherein, on the other hand, such substrate is subjected to a very high molecular orientation during production thereof. The production of the substrate includes injection molding the thermotropic polymer by injection into a suitable mold provided with a central injection system for the polymeric material.

Under the conditions of conversion, a natural orientation develops and this, because of an inlet feed at the center or axis of the shaped article, is in a favorable and plane-isotropic manner in the case of a circularly symmetrical geometry as to produce a structure which exhibits Accordingly, the present invention provides an etched, circular, rigid injection molded polymeric material substrate, adapted for use as an optical medium which is characterized by an external diameter of from about 60 nm to 360 nm, a thickness from 0.5 nm 4 nm, a relative density of less than 1.8, a modulus of elasticity in the radial direction from 900 MPa to 18000 MPa, a coefficient of heat expansion in the radial direction which is less than 30 $\mu m/m°C.$, a deformation temperature under load of at least 150° C. and, on part or all of at least one of its faces, an etching made at the time of the injection molding operation consisting of a groove in the form of a spiral or of concentric tracks, with a pitch of between 0.4 and 1 $\mu m$. The rigid substrate is formed by injection molding a thermotropic aromatic polyester polymer having a flow temperature ranging from 200Ⓡ to 350° C. and an inherent viscosity of at least 1 dl/g in a mold fitted with a central injection system under the following conditions: (1) temperature of the molten polymer of from 280° to 350° C.; (2) injection of from 80 MPa to 160 MPa; (3) a temperature of the mold walls which ranges from 100° to 200° C.; (4) an injection time which ranges from 2 to 10 seconds and (5) a holding pressure after injection which ranges from 40 MPa to 120 MPa. The resulting substrate is substantially perfectly smooth on the non-etched parts of its face as reflected in a surface roughness of less than 0.05 $\mu m$ and is substantially perfectly planar as reflected in an angle of buckling (warp angle) of less than $1 \times 10^{-5}$ radian.

DETAILED DESCRIPTION OF THE PREFERRED EMBODIMENTS OF THE INVENTION

Figure 1:
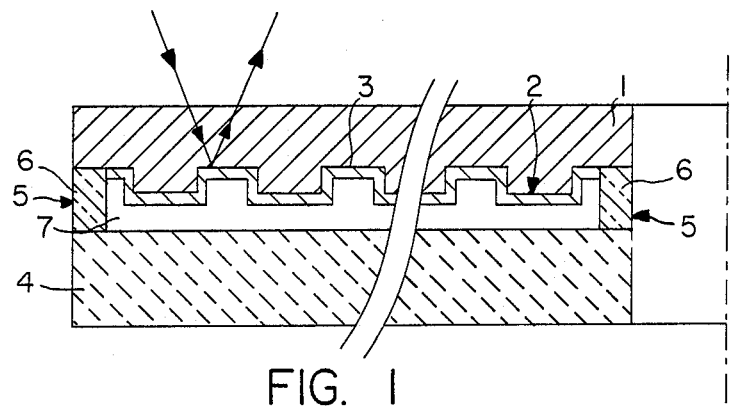
FIG. 1 is a fragmentary cross-sectional view of a standard optical disc construction, through a plane containing the axis thereof.
Figure 2:
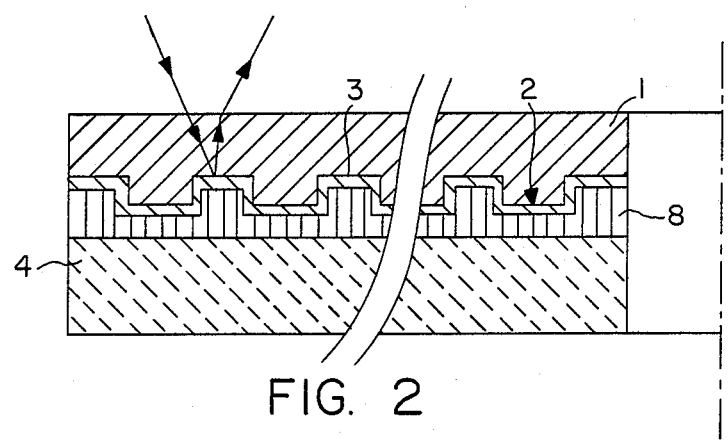
FIG. 2 is also a fragmentary cross-sectional view of a standard optical disc construction, also through a plane containing the axis thereof.

More particularly according to the present invention, in general, the molded circular substrates which are produced advantageously have the following principal dimensions: external diameter: from 60 mm to 360 mm; thickness: from 0.5 mm to 4 mm. Typically, the substrates which are of greatest interest because of existing standards have the following dimensions: external diameters: 90 mm (3½ inches), 130 mm (5¼ inches), 200 mm (8 inches), 305 mm (12 inches) and 355 mm (14 inches), thus enabling the production of discs having a capacity ranging from 50 megabytes to 2 gigabytes; thickness: from 0.8 mm to 1.5 mm.

The molded circular substrates produced have, on a part or all of at least one of the face surfaces thereof (that or those destined to support a sensitive recording layer), a microetching produced at the time of the injection molding operation, typically a groove in the shape of a spiral or concentric tracks, with a pitch of from 1 to 2 μm, a depth of from 400 to 15,000 angstroms and a width of from 0.4 to 1 μm.

The thermotropic polymers which are suitable for use according to the present invention comprise wholly aromatic polyesters, alkylaromatic polyesters, wholly aromatic poly(esteramides), alkylaromatic poly(esteramides), aromatic polyazomethines, aromatic carbonate polyesters and mixtures of such polymers.

In a preferred embodiment of the present invention, the thermotropic polymers are wholly aromatic polyesters, alkylaromatic polyesters, aromatic carbonate polyesters and mixtures of these polymers. The wholly aromatic polyesters are especially preferred.

Representative wholly aromatic polyesters which are thermotropic, namely, which are adapted to form anisotropic melts, are described, for example, in U.S. Pat. Nos. 3,991,013, 3,991,014, 4,066,620, 4,075,262, 4,118,372, 4,130,545, 4,181,792, 4,188,476, 4,219,461, 4,224,433, 4,230,817 and 4,346,208, and in European Patent Application No. 86/420,013.4, published under No. 0,191,705.

Representative alkylaromatic polyesters which are thermotropic are described, for example, in U.S. Pat. Nos. 3,778,410, 3,804,805, 4,248,995, 4,311,824 and 4,355,133.

Representative carbonate polyesters which are thermotropic are described, for example, in U.S. Pat. Nos. 4,107,143, 4,284,757 and 4,371,660.

The thermotropic polymers which are advantageously selected according to the present invention are those which have a flow temperature in the range of from 200° C. to 350° C. and which have an inherent viscosity of at least 1 dl g$^{-1}$, and more preferably from 1.1 to 4.0 dl g$^{-1}$. By "flow temperature" is intended the temperature at which the edges of a test specimen in the shape of a polymer chip or of a cut fiber begin to become rounded. This temperature is determined by visual inspection of the test specimen on a glass slidecover at a suitable rate of temperature increase, generally on the order of 10° C. to 20° C. per minute, the observation being made with the aid of a microscope fitted with a heated stage known commercially under the trademark Thermopan. With regard to the inherent viscosity, it is measured at 25° C. on a solution containing 0.5 g of polymer per 100 cm$^3$ of a solvent mixture of para-chlorophenol and 1,2-dichloroethane (50/50 by volume).

The wholly aromatic thermotropic polyesters which are most especially preferred according to the present invention are those described in European Patent Application No. 86/420,013.4, published under No. 0,191,705. These polyesters have the following characterizing features:

(i) they comprise recurring units of the formulae (I), and if desired, (II), (III) and (IV):

(I) represents the structure:

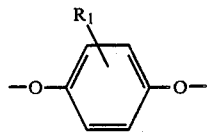

in which R$_1$ is a methyl or ethyl radical or a chlorine or bromine atom, with the proviso that the units (I) may either be identical or different;

(II) represents the structure:

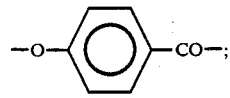

(III) represents the structure:

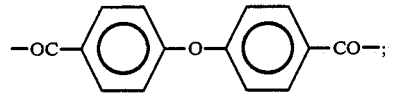

(IV) represents the structure:

(ii) the molar ratio of the recurring units (I) relative to the sum of the recurring units (II)+(III) ranges from 0.95 to 1.05;

(iii) the quantity of recurring units (II) in the mixture (II)+(III) ranges from 0 to 70 mole % and that of the recurring units (III), relative to the same mixture, ranges from 100 to 30 mole %;

(iv) the quantity of recurring units (IV), relative to the quantity of the recurring units (I), ranges from 10 to 300 mole %.

These especially preferred wholly aromatic polyesters also include polymers whose structures may additionally contain aromatic units which form ester groups (dioxy units and/or dicarbonyl units and/or mixed oxy/carbonyl units) having a structure other than those of the recurring units (I), (II), (III) and (IV), the total quantity of these additional units not exceeding 10 mole % relative to the quantity of the recurring units (I). Exemplary of such additional recurring units are the following:

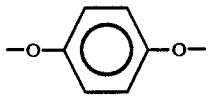 (I')

and/or

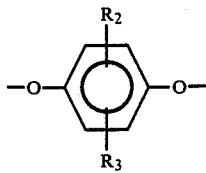 (I'')

wherein $R_2$ and $R_3$, which may be identical or different, each have the definition given above for $R_1$, with the proviso that recurring units (I'') may either be identical or different, and/or

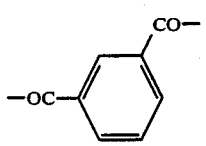 (II')

and/or

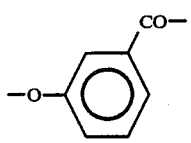 (IV')

The alkylaromatic thermotropic polyesters which are most especially preferred are those described in U.S. Pat. Nos. 4,248,995 and 4,311,824. These polyesters include recurring units of the formulae:

$$(-O-X_1-O-)_a (-O-X_2-O-)_b (-O-X_3-O-)_c \quad (V)$$

$$-CO-Y-CO \quad (VI)$$

$$-CO-Z-CO \quad (VII)$$

in which
$X_1$ is a 1,4-phenylene radical monosubstituted by a methyl or ethyl group or a chlorine or bromine atom,
$X_2$ is an unsubstituted 1,4-phenylene radical,
$X_3$ is a 1,4-phenylene radical disubstituted by two methyl or ethyl groups or 2 chlorine or bromine atoms, or a 4,4'-diphenylene radical or p,p'-diphenylene ether in which each aromatic nucleus may be substituted by a methyl or ethyl group or a chlorine or bromine atom, with $0.4 \leq a \leq 1$ $0 \leq b \leq 0.6$ $0 \leq c \leq 0.1$ and $a+b+c=1$,
Y is:

a 1,4-phenylene or 1,4-cyclohexylene radical, or a radical containing two phenylene groups linked together by a single chemical bond or an acyclic chain capable of containing up to 8 carbon atoms and, if desired, 1 or 2 hetero atoms, or a divalent aromatic radical containing at least two condensed phenyl nuclei in which the bonds linked to the carbonyl groups are opposite and parallel;

Z is a $-(CH_2)_n-$ radical wherein $3 \leq n \leq 10$; and the molar ratio Z/Y+Z ranges from 20 to 50%.

The thermotropic carbonate polyesters which are most especially preferred are those described in U. S. Pat. No. 4,284,757. These polyesters include recurring units of the formulae:

$$(-O-R_4-O-)_{a'}, (-O-R_5-O-)_{b'} \quad (VIII)$$

 (IX)

 (X)

in which:
the radicals $R_4$, which are identical, are each a 1,4-phenylene radical monosubstituted by a methyl or ethyl group or a chlorine or bromine atom;
the radicals $R_5$ are each an unsubstituted 1,4-phenylene radical;

with $0.3 \leq a' \leq 1$; $0 \leq b' \leq 0.7$; and $a'+b'=1$;

the radicals $R_6$, which may be identical or different, are each 1,4-phenylene, 1,4-cyclohexylene, 4,4'-biphenylene, 2,6-naphthylene, 4,4'-ethylenedioxy-1,1'-diphenylene, 4,4'-butylenedioxy-1,1'-diphenylene or 4,4'-hexylenedioxy-1,1'-diphenylene radicals; and the quantity of the recurring units (IX) in the mixture of (IX) and (X) ranging from 30 to 90 mole %; and the molar ratio of the recurring units (VIII) relative to the sum of the recurring units (IX)+(X) ranging from 0.95 and 1.05.

The substrates for the optical discs according to the present invention are produced by an injection molding process effected in the anisotropy region of the thermotropic polymer employed. It will be appreciated that the thermotropy is easy to demonstrate when the polymer in melt form is observed in an optical system equipped with two crossed polarizers (90° C.): birefringence and transmission of polarized light through the crossed polarizers occurs in the case of the anisotropic specimens. Demonstration of the anisotropy of the polyesters according to the present invention has been carried out using the TOT thermooptical method described in French Patent No. 2,270,282. By "anisotropy region" is intended the temperature range which begins with the temperature at which the birefringence and the transmission of light through the two crossed polarizers appear, and which is situated above said temperature, a range which has a variable upper limit and in which the molten mass is anisotropic without any risk of polymer decomposition. In general, the anisotropic molten masses which are injection-molded according to the present invention have an anisotropy region extending over at least 30° C.

More particularly, the substrates according to this invention are produced by injecting using apparatus which is per se known to this art, the anisotropic molten mass into a circular mold, the geometric characteristics of which are adapted to the structure and to the desired dimensions of the substrates required and which is equipped with a system permitting central or axial injection of the polymeric material. The operating conditions enabling production of substrates according to this invention are the following: mold wall temperature: 100° C. to 200° C.; temperature of the molten polymer: 280° C. to 350° C.; injection time: 2 to 10 seconds; injection pressure: 80 MPa to 160 MPa; holding pressure: 40 MPa to 120 MPa.

Figure 6:
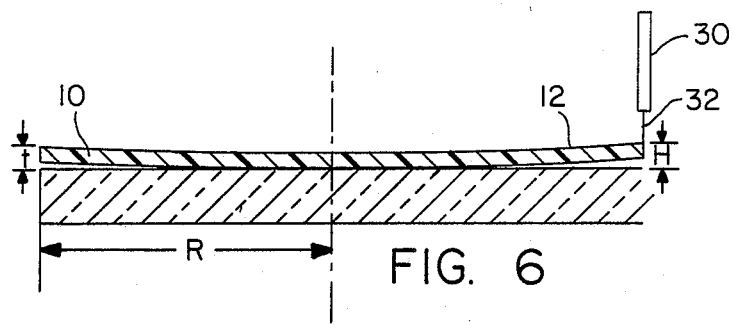
FIG. 6 is a schematic view, in elevation, showing the technique for measuring warp angle of the invention molded substrate.

The molded circular substrates which are produced have a low relative density of less than 1.8 and display the desired and requisite properties. More precisely, they have a high modulus of elasticity in the radial direction, ranging from 9,000 MPa to 18,000 MPa, and a coefficient of thermal expansion in the radial direction which is less than 30 $\mu$m/m/°C. and which, more preferably, ranges from 10 to 20 $\mu$m/m/°C. The advantages of the molded substrates which are produced are not restricted to these two properties; it should be noted, in particular, that these materials also have a high DTUL, of at least 150° C., and which can attain values up to 240° C. and even higher, and good dimensional stability with low degree of shrinkage on demolding and that, insofar as physicochemical properties are concerned, they are naturally insensitive to solvents and have very slight moisture-sensitivity. By virtue of the injection molding from a central injection port and under the specified molding conditions using the particular thermotropic polymers, it has become possible to greatly control shrinkage forces in the radial direction which tend to form during cooling of the molded substrate. By controlling variable radial shrinkage forces during cooling, warping of the substrate is substantially eliminated such that in the non-etched portions of the substrate, the substrate surface is substantially perfectly planar. As used herein "substantially perfectly planar" or "perfect planarity" is defined as an angle of buckling (warp angle) (defined as the ratio H/R, for a circular molded substrate, where H is the vertical distance between a point on the top surface of the substrate, at the periphery of the substrate and a perfectly smooth marble or glass like reference surface on which the center of the circular substrate is held, and R is the radius of the substrate measured in the same units as H; see FIG. 6) which is less than $1 \times 10^{-5}$ radian. Furthermore, the anisotropic melts employed in the injection-molding operations are characterized by very high fluidity when heated, and this makes it possible to produce shaped articles exhibiting an excellent surface profile and, in particular, an etching which is reproducible with great accuracy.

After the molding operation and before or after demolding, the substrates produced may be subjected to a heat treatment at a high temperature, but below the melting point of the polymer. After demolding and cooling, the substrates produced are subjected to the conventional treatment intended to produce (or to apply a final finish to) the central aperture, and then they are combined (this constituting another object of the present invention) with the other materials and elements which are necessary to convert same into finished optical discs.

The substrates according to the present invention are not transparent, and this prevents them from serving both as a support for the optical recording layer and for the input layer through which the laser beam passes. In order to produce optical discs, they must be combined with a transparent material defining the input layer to form a structure which is identical or equivalent to the embodiment described above in reference to FIG. 3.

Thus, the present invention also features discs for the storage of data (intelligence) that can be read by a laser beam, which comprise:

(i) at least one transparent input layer;

(ii) a substrate of rigid polymeric material comprising on at least a part of the face surface confronting the input layer a microetching inscribed at the time of the injection molding operation on the substrate, the substrate pre-etched in this manner being additionally coated with a reflective sensitive recording layer; and (iii) the input layer and the substrate being sealed by means such that the reflective sensitive layer is isolated from the external environment in a leakproof manner or otherwise; and (iv) said optical discs being characterized in that the substrate is based on a thermotropic polymer and, during fabrication thereof, is subjected to a very high molecular orientation by injection-molding said thermotropic polymer via injection thereof into a suitable mold through a central injection system for the polymeric material.

Figure 3:
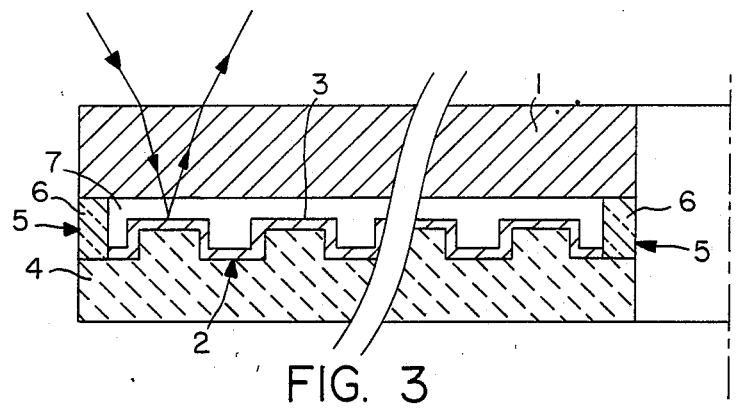
FIG. 3 is also a fragmentary cross-sectional view of a standard optical disc construction, again through a plane containing the axis thereof.
Figure 4:
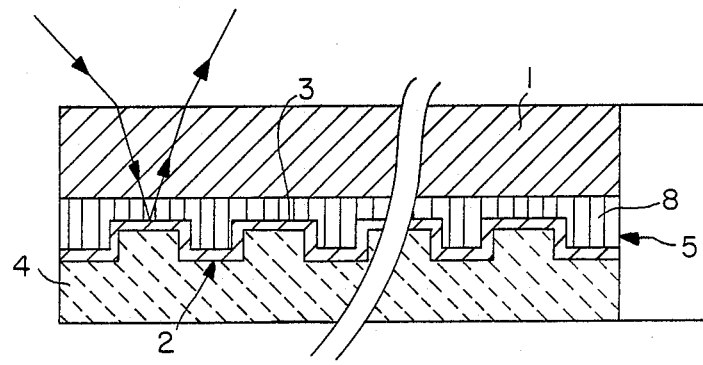
FIG. 4 is a fragmentary cross-sectional view of a "single input" optical disc including a rigid thermotropic substrate according to the invention, through a plane containing the axis thereof.

In the case of an optical disc having a single input layer, which is illustrated diagrammatically and to no particular scale in FIGS. 3 and 4, an advantageous construction includes combining the substrate 4 (produced from the thermotropic polymer and supporting the reflective sensitive layer 3) with an input layer 1, here defined by a circular plate made of glass or of a conventional transparent plastic. The means 5 for securing the substrate 4 coated with the sensitive layer 3 to the input layer 1 differ, depending on whether it is desired to produce a structure of the air seal sandwich type (or air sandwich) or a standard laminated type structure.

FIG. 3 illustrates an optical disc of the air sandwich type according to the invention in which the connecting means 5 securing the input layer 1 to the substrate 4 comprises resilient coaxial seals 6 which ensure perfect sealing, if desired. FIG. 4 illustrates an embodiment of an optical disc of standard laminated structure according to the invention, in which the connecting means 5 comprises a transparent polymeric bonding material 8. The selection of the method of assembly generally depends more on the characteristics of the sensitive layer 3 than on the material used to form the substrate 4. However, in the case of a thermotropic substrate, the high rigidity of this material is well suited for the production of structures of the sealed air-sandwich type, which must withstand external pressure changes without undergoing distortion, particularly in the case of large diameter discs.

The use of an input layer 1 made of glass and of a substrate 4 made of thermotropic polymer is most especially advantageous when it is desired to manufacture discs of a large diameter, greater than 200 mm (8 inches), which are also leakproof, because, in this case, the entire structure has very high rigidity which is essential for maintaining the sealing. In a structure of this type, since the glass input layer 1 does not receive a pre-etching and is not employed for the deposition of the recording layer, its efficiency is very high and its cost is reduced to a minimum, in contrast to the situation when such material serves both as an input face surface and a substrate.

In the case of small diameter optical discs, for example, ranging from 130 mm (5¼ inches) to 200 mm (8 inches), an input layer 1 made of conventional molded or cast transparent plastic material is possible, without deterioration of the overall rigidity characteristics contributed by the thermotropic polymer substrate.

To produce an optical disc having two input face surfaces, two discs having a single input layer, such as those described in FIGS. 3 and 4, may be arrayed back-to-back.

The present invention also features optical discs having two input layers which are situated on each side of a single and sole substrate made of rigid polymeric material, each face surface of the said substrate confronting each input layer supporting on at least a part of its surface a microetching inscribed at the point in time of the injection molding operation. Surmounting this pre-etched face surface is a deposit of a reflective recording layer, and each input face surface is secured to the substrate by connecting means such that the two reflective recording layers are isolated from the external environment in a leakproof manner or otherwise. Such optical discs are also characterized in that the substrate is based on a thermotropic polymer and during the preparation thereof, the substrate is subjected to a very high molecular orientation, said preparation again including injection molding the thermotropic polymer into a suitable mold cavity via a central injection port for the polymeric material as described in detail above.

Figure 5:
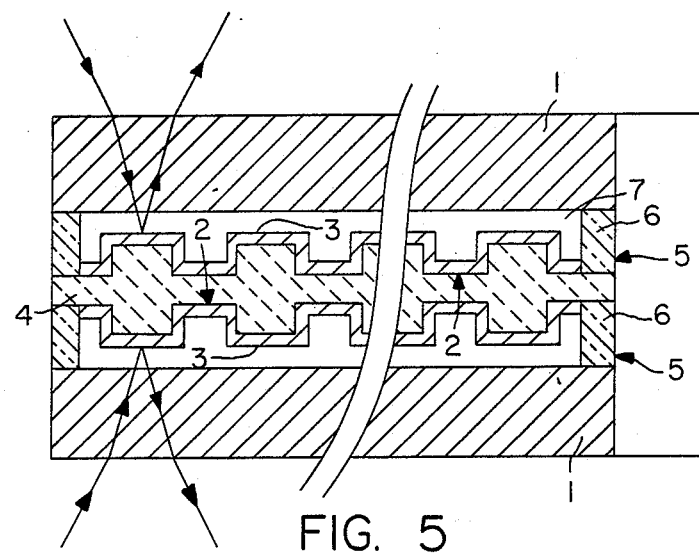
FIG. 5 is a fragmentary cross-sectional view of a "dual input" optical disc including a common rigid thermotropic substrate according to the invention, also through a plane containing the axis thereof.

FIG. 5 illustrates diagrammatically, also on no particular scale, the embodiment of an optical disc having a pair of input face surfaces 1 and a common thermotropic polymer substrate 4. In this particular configuration, the connecting means 5 securing the input layers 1 and the substrate 4, comprising the pre-etched grooves 2 and the recording layers 3 on the two face surfaces, are defined by resilient coaxial seals 6.

The technology described above can be used to produce any of the different types of optical discs:

(a) nonerasable discs, of the ROM type; in this case, the pre-etching of the thermotropic polymer substrate also provides the additional microreliefs which are required to store the data and the substrate needs only to be metallized to produce the required contrast between the planar regions and the microreliefs;

(b) erasable discs, of the WORM type; because of its enhanced thermal behavior and its good solvent resistance, the thermotropic polymer substrate is well suited for both deposition of metallic layers (tellurium, noble metals) and of colorants or of undercoats of polymers in solution form which are deposited by coating; and (c) repeatedly erasable discs of magnetooptical or other type.

The techniques for deposition of the sensitive recording layer are well known to this art (coating, vacuum evaporation), and have heretofore been used for deposition onto glass substrates. They are equally applicable to thermotropic polymer substrates because of the good temperature and solvent resistance of the latter.

In order to further illustrate the present invention and the advantages thereof, the following specific examples are given, it being understood that same are intended only as illustrative and in nowise limitative.

EXAMPLE 1

This example illustrates production of a circular, rigid substrate according to the present invention, etched on one of the face surfaces thereof.

1. Description of the thermotropic polymer employed:

A wholly aromatic polyester was prepared, of the type as that described in European Patent Application No. 86/420,013.4, published under No. 0,191,705.

The following reactants and catalysts were introduced into a 7.5-liter polycondensation reactor which was stirred and heated by means of a heat transfer fluid circulating in the reactor jacket and equipped with a device for distillation and for purging with an inert gas:

| | |
|---|---|
| (1) chlorohydroquinone diacetate: [molar ratio (1)/(2) + (2) = 1]; | 1028 g |
| (2) terephthalic acid: [50 mole % in the mixture of (2) + (3)]; | 373 g |
| (3) di(4-carboxyphenyl) ether: [50 mole % in the mixture of (2) + (3)]; | 581 g |
| (4) para-acetoxybenzoic acid: [34 mole % based on (1)]; and | 275.5 g |
| (5) magnesium acetate: [500 ppm]. | 1.13 g |

The reactor was purged with nitrogen and was then heated with the heat transfer fluid, having a temperature of 260° C., for 2 hours and 20 minutes. The volume of acetic acid which was distilled off was 506 cm$^3$ (i.e., 83% of theory). The temperature of the metal bath was then gradually raised to 330° C. over 40 minutes, while the pressure was reduced at the same time from $1,010 \times 10^2$ Pa to $0.39 \times 10^2$ Pa. After the distillation of acetic acid had stopped, the temperature was maintained at 330° C. and the pressure at $0.39 \times 10^2$ for 12 minutes, 30 seconds. The total volume of acetic acid collected was 602 cm$^3$ (i.e., 100% of theory).

The polymer produced was greyish and fibrous in appearance. It had an inherent viscosity of 1.4 dl g$^{-1}$. Its flow temperature was 290° C. The anisotropy region ranged from 290° C. to above 350° C.

2. Injection molding of the substrate

The polymer was processed on a Battenfeld BSKM 70 S DS 2,000 injection molding machine. The circular mold employed had the following characteristics: diameter: 305 mm±0.10 mm; thickness: 1.5 mm±0.025 mm; central injection via a 4-mm diameter nozzle. With regard to the mold faces, one was polished, while the other bore a "negative" pattern of the etching to be transferred to the finished substrate.

The molding conditions were as follows:
(i) Temperature of the mold faces: 130° C.
(ii) Temperature of the polymer melt: 320° C.,
(iii) Injection time: 2.5 seconds,
(iv) Injection pressure: 120 MPa,
(v) Holding pressure: 90 MPa.

3. Machining of the substrate:

After demolding and cooling, a coaxial central hole mm in diameter was cut in the substrate.

4. Properties of the molded substrate:

(a) Surface quality:

The face surface supporting the sensitive layer had a groove inscribed therein in the form of a spiral which had a pitch of 1.7 μm, a depth of 700 angstroms and a width of 0.6 μm.

For comparison purposes, the molding operation of Example 1 was repeated using the same thermotropic polymer as used in Example 1 and using the same injection molding machine as used in Example 1 with the same circular mold and central injection port, except that the molding conditions of mold temperature, injection time and injection pressure were varied as shown in the following Table 1. Also shown in Table 1 are the measurements of surface roughness and warp angle measured in the same way as in Example 1.

From Test A, it is seen that where the temperature of the mold surface is below the minimum lower limit of 100° C., namely at 80° C., the warp angle is increased to $3.5 \times 10^{-5}$ radian. At a mold temperature of 40° C. as in Test B, the warp angle becomes as high as $60 \times 10^{-5}$ radian, even when the pressure is reduced to 60 MPa.

Test C shows that when the applied pressure during molding is below the lower limit of 40 MPa, namely at 20 KPa, the warp angle is again as high as $6 \times 10^{-5}$ radian.

Test D and E show the criticality of the duration of the injection molding. In test D, the injection molding time was 15 seconds and the warp angle was $1.08 \times 10^{-5}$ radian, while the surface roughness is greater than 1 μm. When the injection molding time is only 0.8 seconds, requiring an increased pressure of 100 MPa, the warp angle is as high as $4.2 \times 10^{-5}$ radian.

TABLE 1

| TEST | Temperature of mold (°C.) | Injection time (seconds) | Injection pressure (MPa) | Warp Angle (Radian) | Surface Roughness (μm) |
|---|---|---|---|---|---|
| Example 1 | 130 | 2.5 | 90 | $0.85 \times 10^{-5}$ | 0.02 |
| A | 80 | 2.5 | 90 | $3.5 \times 10^{-5}$ | a |
| B | 40 | 2.5 | 60 | $60 \times 10^{-5}$ | a |
| C | 130 | 2.5 | 20 | $6 \times 10^{-5}$ | a |
| D | 130 | 15 | 90 | $1.08 \times 10^{-5}$ | >1 |
| E | 130 | 0.8 | 100 | $4.2 \times 10^{-5}$ | a | a: not measured

The other face surface of the substrate was perfectly smooth, having a surface roughness on the order of 0.02 μm.

The surface roughness characteristic has established, using a Taylor-Hobson instrument known as Talystep under the following conditions: static touch sensor: tip radius: 0.013 mm, the vertical motion of the sensor being amplified electronically; sensor contact load: set at 50 mg; signal interruption frequency: 0.76 mm; sensitivity: 20 angstroms. The surface roughness is the average value of the dimensional difference in peaks and valleys over a surface length of distance of 1 micron.

Warp Angle: $0.85 \times 10^{-5}$ radian.

The warp angle is measured (see FIG. 6) by securing the substrate 10 on top of a perfectly smooth reference plate 20 (having a marble-like surface). The distance H between the plate top 22 and substrate top surface 12 at the periphery thereof is obtained by a differential measurement using a transducer 30 with an inductive gauge tip 32 (a Millitron 1202D available from Feinprüf Mahr was used), taking the thickness t of the substrate into consideration.

The warp angle is taken as the average of 10 measurements made on each of 3 different substrates, the 10 measurements being made at 10 equidistant points on the periphery, i.e. at a spacing of 36°.

(b) Mechanical properties:

The determination of mechanical properties was carried out using test specimens taken radially (in the direction of flow) from the molded substrate produced:

Tensile properties:

The moduli and the strength were measured at 23° C. according to French Standard NF T 51034 on dumbbell-shaped test specimens 4 mm in width and 2 mm thick, conditioned at an RH of 50%;

(i) Radial modulus of elasticity (Mr): 13,000 MPa,
(ii) Radial tensile strength: 100 MPa,
(iii) Elongation at break: 3%.

Coefficient of thermal expansion:

The dimensional stability of the substrate was evaluated by means of measurements of the coefficient of linear thermal expansion on parallelepipedal test specimens 5%33 5×2 mm in size, taken radially (αr) (ASTM Standard D 696-70; temperature ranges: −30° C. to +30° C.; measurements under dry nitrogen):

αr: 15 μm/m.C,

DTUL:

The deformation temperature under load was measured according to French Standard NF T 51005; its value was 250° C. (under 1.82 MPa).

(c) Physicochemical properties:

Relative density: d=1.45.

Crystallinity: the structure was semicrystalline.

Water uptake: below 100 ppm. To measure this, a sample (test specimen AFNOR T 51034) was dried at 150° C. for 3 hours, then weighed (weight $W_o$) and immersed in water at room temperature for 48 hours. It was then removed from the water, its surface was wiped dry and it was reweighed (weight w): the water uptake was equal to $(w-wo/wo) \times 10^6$.

EXAMPLE 2:

This example illustrates production of an optical disc according to the present invention, namely, a writable noneraseable optical disc 305 mm (12 inches) in external diameter having a structure such as that illustrated in FIG. 3 of the drawings.

1. Input face 1:

This was a perfectly flat circular glass disc having an outer diameter of 305 mm and a thickness of 1.2 mm.

2. Substrate 4:

This was a preetched thermotropic polymer substrate having an external diameter of 305 mm and a thickness of 1.5 mm, produced according to the procedure of Example 1.

3. Reflective recording layer 3:

The pre-etched surface of the substrate 4 was coated with a nitrocellulose undercoat 0.5 μm in thickness, deposited by centrifugation at a speed of 6 revolutions per second using a solution containing 8 g of nitrocellulose per liter of material of trademark AZ Thinner (solvent mixture marketed by the Shipley Company). After evaporation of the substrate, the organic undercoat was topcoated with a layer of a Cr(20)/Au(80) alloy (percentage by weight) to a thickness in the region of 10 nm, by evaporation under vacuum.

4. Combination inout face 1/substrate 4 coated with the recording layer:

This was produced using a connecting means 5 consisting of resilient coaxial seals 6 based on a photopolymerizable resin which permitted a completely leakproof air-sandwich type structure to be produced.

5. Recording data on the disc:

Intelligence was inscribed on the recording layer 3 through the input face 1 using the beam emitted by a semi-conductor laser ($\lambda = 820$ nm) having a power of 9 mW, modulated at a frequency of 2.5 MHz, the disc being driven at a constant speed of 900 revolutions/minute. A series of imprints of a width of 0.6 $\mu$m and a length of from 0.6 to 2.5 $\mu$m was produced, in the form of microreliefs resulting from the distortion of the metallic sensitive layer as a result of the heating and the decomposition of the nitrocellulose undercoat.

6. Readout of the disc:

From a recorded recording layer of the above type, readout of the data was conducted using a laser power of 1 mW with a signal/noise ratio of 50 decibels. The stability of the substrate and of the recording layer was such that the disc could be stored at 45° C. at 80% relative humidity for 30 days without the appearance of any appreciable decrease in signal amplitude.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A dimensionally stable, circular, rigid and planar substrate, adapted for use as a support substrate for a radiation sensitive layer for an optical disc, said substrate having an external diameter of from 60 mm to 360 mm, a thickness of from 0.5 mm to 4 mm, a relative density of less than 1.8, a modulus of elasticity in the radial direction of from 9000 MPa to 18000 MPa, a coefficient of heat expansion in the radial injection which is less than 30 m/m/°C., a deformation temperature under load of at least 150° C., and, on part or all of at least one of its faces, an etching made at the time of the injection molding operation consisting of a groove in the form of a spiral or of concentric tracks, with a pitch of between 0.4 and 1 $\mu$m; said substrate being formed by injection molding a thermotropic aromatic polyester polymer having a flow temperature ranging from 200° to 350° C. and an inherent viscosity of at least 1 dl/g in a mold fitted with a central injection system under the following conditions: (1) temperature of the molten polymer of from 280° to 350° C.; (2) injection pressure of from 80 MPa to 160 MPa; (3) a temperature of the mold walls which ranges from 100° to 200° C.; (4) an injection time which ranges from 2 to 10 seconds and (5) a holding pressure after injection which ranges from 40 MPa to 120 MPa, whereby said substrate is substantially perfectly smooth on the non-etched parts of its faces as reflected in a surface roughness of less than 0.05 m and is substantially perfectly planar as reflected in a warp angle of less than $1 \times 10^{-5}$ radian.

2. The substrate of claim 1 which comprises in said groove a radiation-sensitive microrelief pattern comprising an etched intelligence pattern.

3. The substrate of claim 1, wherein said groove comprises a spirally inscribed microrelief pattern.

4. The substrate of claim 1, wherein said groove comprises a plurality of concentric tracks.

5. The substrate of claim 1, having a radiation-sensitive microrelief pattern on both face surfaces thereof.

6. The substrate of claim 1 wherein said thermotropic polymer comprises a wholly aromatic polyester, alkylaromatic polyester, wholly aromatic poly(esteramide), alkylaromatic poly(esteramide), aromatic polyazomethine, aromatic carbonate polyester or mixture thereof.

7. The substrate of claim 6 wherein said thermotropic polymer comprises a wholly aromatic polyester, alkylaromatic polyester, aromatic carbonate polyester or mixture thereof.

8. The substrate of claim 7 wherein said thermotropic polymer has an inherent viscosity ranging from 1.1 to 4.0 dl/g.

9. The substrate of claim 1 wherein said thermotropic aromatic polyester polymer is a wholly aromatic polyester polymer.

10. The substrate of claim 9 wherein said wholly aromatic polyester polymer comprises recurring units of the following formulas (I), (III) and (IV) and, optionally (II):

in which $R_1$ is methyl, ethyl, chlorine or bromine, with the proviso that the units (I) are the same or different;

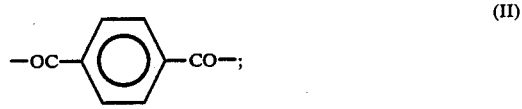

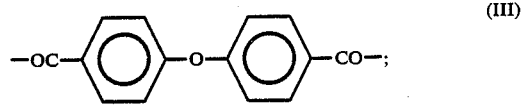

and

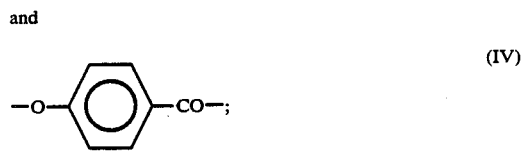

wherein the molar ratio of the recurring units (I) relative to the sum of the recurring units (II) and (III) ranges from 0.95/1 to 1.05/1; the quantity of units (II) to the mixture of units (II) and units (III) is from 0 to 70 mole %, and that of units (III), relative to the mixture of units (II) and (III), ranges from 100 to 30 mole %; and the quantity of recurring units (Iv), relative to the quantity of units (1), ranges from 10 to 300 mole %.

11. The substrate of claim 1 wherein said thermotropic aromatic polyester polymer is an alkyl aromatic polyester consisting of units of formulae:

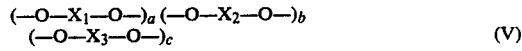

in which:

$X_1$ denotes a 1,4-phenylene radical monosubstituted by a methyl or ethyl group or a chlorine or bromine atom, $X_2$ an unsubstituted 1,4-phenylene radical, $X_3$ denotes a 1,4-phenylene radical disubstituted by two methyl or ethyl groups or 2 chlorine or bromine atoms, or a 4,4'-diphenylene radical or p,p'-diphenylene ether in which each aromatic nucleus may be substituted by a methyl or ethyl group or a chlorine or bromine atom, with $0.4 \leq a \leq 1$ $0 \leq b < 0.6$ $0 \leq c < 0.1$ and $a+b+c=1$, Y denotes:
a 1,4-phenylene or 1,4-cyclohexylene radical or a radical containing two phenylene groups capable of being linked together by a single bond or an acyclic chain capable of containing up to 8 carbon atoms and, if desired, 1 or 2 hetero atoms, or a divalent aromatic radical containing at least two condensed phenyl nuclei in which the bonds linked to the carbonyl groups are opposite and parallel, and Z denotes a $-(CH_2)_n-$ radical with $3 \leq n \leq 10$ the molar ratio $Z/Y+Z$ being between 20 and 50%.

12. The substrate of claim 1 wherein said thermotropic aromatic carbonate polyester consist of units of formulae:

 (VIII)

 (IX)

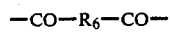 (X)

in which:
the radicals $R_4$, which are identical, each denote a 1,4-phenylene radical monosubstituted by a methyl or ethyl group or a chlorine or bromine atom,
the radicals $R_5$ each denote an unsubstituted 1,4-phenylene radical with $0.3 \leq a' \leq 1$; $0 \leq b' \leq 7$; and $a'+b'=1$, the radicals $R_6$, which may be identical or different, each denote a radical chosen from 1,4-phenylene, 1,4-cyclohexylene, 4,4'-diphenylene, 2,6-naphthylene, 4,4'-ethylenedioxy-1,1'-diphenylene, 4,4,'-butylenedioxy-1,1'-diphenylene and 4,4'-hexylenedioxy-1,1'-diphenylene groups; the quantity of the units (IX) in the mixture of (IX) and (X) being between 30 and 90 mole %; and the molar ratio of the units (VIII) in relation to the sum of the units (IX)+(X) being between 0.95 and 1.05.

13. In an optical disc comprising at least one transparent light incident layer and at least one radiation-sensitive layer supporting substrate, the improvement which comprises, as the radiation-sensitive layer supporting substrate therefor, the rigid and planar substrate as defined by claim 1.

14. In an optical disc comprising at least one transparent light incident layer and at least one radiation sensitive layer supporting substrate, the improvement which comprises, as the radiation-sensitive layer supporting substrate therefor, the thermotropic disc element as defined by claim 6.

* * * * *

UNITED STATES PATENT AND TRADEMARK OFFICE
CERTIFICATE OF CORRECTION

PATENT NO. : 4,959,252

DATED : September 25, 1990

INVENTOR(S) : Claude Bonnebat and Jean-Pierre Quentin and Alain Morin

It is certified that error appears in the above-identified patent and that said Letters Patent is hereby corrected as shown below:

Column 15, line 36
Claim 1, line 8, delete "injection", insert --direction--;
       line 37
       line 9, delete "30 m/m/°C", insert --30 μm/m/°C--;
       line 55
       lines 26-27, delete "0.05 m", insert --0.05 μm--.
Column 16, line 40
Claim 10, line 18, delete "(Iv)", insert --(IV)--;
       line 53
       line 19, delete "(1)", insert --(I)--.
       line 62
Claim 11, line 6, delete formula (VII) and insert therefor -- -CO-Z-CO- --.

Signed and Sealed this

Seventh Day of April, 1992

*Attest:*

HARRY F. MANBECK, JR.

*Attesting Officer*      *Commissioner of Patents and Trademarks*